US008972742B2

(12) United States Patent
Troncoso Pastoriza et al.

(10) Patent No.: US 8,972,742 B2
(45) Date of Patent: Mar. 3, 2015

(54) SYSTEM FOR SECURE IMAGE RECOGNITION

(71) Applicants: Juan Ramon Troncoso Pastoriza, Vigo (ES); Fernando Perez Gonzalez, Vigo (ES)

(72) Inventors: Juan Ramon Troncoso Pastoriza, Vigo (ES); Fernando Perez Gonzalez, Vigo (ES)

(73) Assignee: Gradiant, Vigo (ES)

( * ) Notice: Subject to any disclaimer, the term of this patent is extended or adjusted under 35 U.S.C. 154(b) by 0 days.

(21) Appl. No.: 13/761,448

(22) Filed: Feb. 7, 2013

(65) Prior Publication Data

US 2013/0148868 A1 Jun. 13, 2013

Related U.S. Application Data

(63) Continuation-in-part of application No. 12/876,233, filed on Sep. 6, 2010, now Pat. No. 8,342,890.

(60) Provisional application No. 61/596,151, filed on Feb. 7, 2012.

(51) Int. Cl.

| | |
|---|---|
| *H04L 29/06* | (2006.01) |
| *H04L 9/32* | (2006.01) |
| *G06K 9/00* | (2006.01) |
| *H04L 9/00* | (2006.01) |
| *G06F 21/32* | (2013.01) |
| *H04L 9/28* | (2006.01) |
| *H04L 9/30* | (2006.01) |

(52) U.S. Cl.
CPC .......... *H04L 9/3231* (2013.01); *G06K 9/00288* (2013.01); *H04L 9/008* (2013.01); *H04L 9/28* (2013.01); *H04L 9/3093* (2013.01); *H04L 63/0861* (2013.01); *G06F 21/32* (2013.01); *G06K 9/00885* (2013.01)
USPC ............................................. 713/186; 380/28

(58) Field of Classification Search
CPC ......... H04L 9/008; H04L 9/28; H04L 9/3093; H04L 9/3231; H04L 63/0861; G06F 21/32
See application file for complete search history.

(56) References Cited

U.S. PATENT DOCUMENTS

| | | | |
|---|---|---|---|
| 7,526,084 B2 | 4/2009 | Smaragdis et al. | |
| 8,130,947 B2 | 3/2012 | Kerschbaum et al. | |
| 8,161,463 B2 | 4/2012 | Johnson et al. | |
| 8,165,352 B1 * | 4/2012 | Mohanty et al. | ............. 382/115 |
| 8,249,250 B2 | 8/2012 | Rane | |
| 8,281,148 B2 * | 10/2012 | Tuyls et al. | .................. 713/185 |
| 8,331,616 B2 * | 12/2012 | Sabe et al. | .................... 382/103 |

(Continued)

OTHER PUBLICATIONS

Zekeriya Erkin et al., Privacy-Preserving Face Recognition. PETS 2009, LNCS 5672, pp. 235-253, 2009.

(Continued)

*Primary Examiner* — Victor Lesniewski
(74) *Attorney, Agent, or Firm* — Mateo Aboy; Aboy & Associates PC

(57) ABSTRACT

Disclosed embodiments include methods, apparatuses, and systems for secured image processing, image recognition, biometric recognition, and face recognition in untrusted environments. The disclosure includes a system for secure image recognition that comprises a secure biometric recognition system configured to work directly with encrypted signals, and the secure biometric recognition system comprises an input quantization system and a homomorphic encryption system configured for noninteractive biometric recognition.

7 Claims, 4 Drawing Sheets

(56) References Cited

U.S. PATENT DOCUMENTS

| | | | |
|---|---|---|---|
| 8,331,632 B1* | 12/2012 | Mohanty et al. | 382/118 |
| 8,364,971 B2* | 1/2013 | Bell et al. | 713/186 |
| 8,542,886 B2* | 9/2013 | Osadchy et al. | 382/118 |
| 8,631,053 B2* | 1/2014 | Sun et al. | 708/200 |
| 8,842,887 B2* | 9/2014 | Beatson et al. | 382/115 |
| 2005/0235148 A1* | 10/2005 | Scheidt et al. | 713/168 |
| 2007/0116283 A1 | 5/2007 | Tuyls et al. | |
| 2007/0220274 A1* | 9/2007 | Jensen et al. | 713/186 |
| 2007/0250718 A1* | 10/2007 | Lee et al. | 713/186 |
| 2007/0266427 A1* | 11/2007 | Kevenaar et al. | 726/5 |
| 2008/0304657 A1* | 12/2008 | Tuyls et al. | 380/28 |
| 2009/0006855 A1 | 1/2009 | Tuyls | |
| 2009/0080778 A1* | 3/2009 | Lee et al. | 382/195 |
| 2009/0113209 A1* | 4/2009 | Lee et al. | 713/186 |
| 2009/0122979 A1* | 5/2009 | Lee et al. | 380/28 |
| 2009/0279694 A1 | 11/2009 | Takahashi et al. | |
| 2010/0106964 A1 | 4/2010 | Hirata et al. | |
| 2010/0299530 A1* | 11/2010 | Bell et al. | 713/186 |
| 2010/0329448 A1* | 12/2010 | Rane et al. | 380/28 |
| 2011/0026781 A1 | 2/2011 | Osadchy | |
| 2011/0110525 A1 | 5/2011 | Gentry | |
| 2012/0039463 A1 | 2/2012 | Gentry et al. | |
| 2013/0014270 A1* | 1/2013 | Sy et al. | 726/26 |
| 2013/0114811 A1* | 5/2013 | Boufounos et al. | 380/255 |
| 2013/0170640 A1* | 7/2013 | Gentry | 380/30 |

OTHER PUBLICATIONS

Craig Gentry et al., Implementing Gentry's Fully-Homomorphic Encryption Scheme. Eurocrypt 2011, LNCS 6632, pp. 129-148, 2011.

Gary B. Huang et al., Labeled Faces in the Wild: A Database for Studying Face Recognition in Unconstrained Environments. 2007.

Pascal Paillier, Public-Key Cryptosystems Based on Composite Degree Residuosity Classes. Published in J. Stern, Ed., Advances in Cryptoogy—EUROCRYPT'99, vol. 1592 of Lecture Notes in Computer Science, pp. 223-238, Springer-Verlag, 1999.

Nicolas Pinto et al., Establishing Good Benchmarks and Baselines for Face Recognition. 2008.

Ahmad-Reza Sadeghi et al., Efficient Privacy-Preserving Face Recognition. ICISC 2009, LNCS 5984, pp. 229-244, 2010.

N.P. Smart et al., Fully Homomorphic Encryption with Relatively Small Key and Ciphertext Sizes.PKC 2010, LNCS 6056, pp. 420-443, 2010.

Juan Ramon Troncoso-Pastoriza et al., A New Model for Gabor Coefficients' Magnitude in Face Recognition. Acoustics Speech and Signal Processing (ICASSP), 2010 IEEE International Conference, Mar. 14-19, 2010, pp. 982-985.

Troncoso-Pastoriza et al. (Juan Ramón Troncoso-Pastoriza, Pedro Comesaña, and Fernando Pérez-González). Secure Direct and Iterative Protocols for Solving Systems of Linear Equations. In SPEED Workshop 2009, pp. 122-141, Lausanne, Switzerland, Sep. 2009.

Bianchi et al. (Bianchi, T., Piva, A., Barni, M.): On the implementation of the discrete Fourier transform in the encrypted domain. IEEE Transactions on Information Forensics and Security 4(1) (2009) 86-97.

Cramer et al. (Cramer, R., Damgard I.): Secure distributed linear algebra in a constant number of rounds. In: 21st Annual International Cryptology Conference on Advances in Cryptology. vol. 2139 of Lecture Notes in Computer Science., Springer (2001) 119-136.

Du et al. (Du, W., Atallah, M.J.): Privacy-preserving cooperative scientific computations. In: Proceedings of the 14th IEEE Computer Security Foundations Workshop, Nova Scotia, Canada (Jun. 2001) 273-282.

Goethals et al. (Goethals, B., Laur, S., Lipmaa, H., Mielikainen, T.): On private scalar product computation for privacy-preserving data mining. In Park, C., Chee, S., eds.: 7th Annual International Conference in Information Security and Cryptology (ICISC 2004). vol. 3506 of Lecture Notes in Computer Science., Seoul, Korea, Springer (Dec. 2004) 104-120.

Craig Gentry. 2009. Fully homomorphic encryption using ideal lattices. In Proceedings of the 41st annual ACM symposium on Theory of computing (STOC '09). ACM, New York, NY, USA 169-178. DOI=10.1145/1536414.1536440.

Kobbi Nissim and Enav Weinreb. Communication Efficient Secure Linear Algebra. Theory of Cryptography. Lecture Notes in Computer Science, 2006, vol. 3876/2006, 522-541, DOI: 10.1007/11681878_27.

Berry Schoenmakers. A Simple Publicly Verifiable Secret Sharing Scheme and Its Application to Electronic Voting. Advances in Cryptology—CRYPTO' 99. Lecture Notes in Computer Science, 1999, vol. 1666/1999, 784, DOI: 10.1007/3-504-48405-1_10.

Marina Blanton. Empirical evaluation of secure two-party computation models, 2005. Technical Report TR 2005-58.

Payman Mohassel and Matthew Franklin. Efficient Polynomial Operations in the Shared-Coefficients Setting, 2006, Lecture Notes in Computer Science, vol. 3958, Public Key Cryptography—PKC 2006, pp. 44-57.

Qingsong Ye. Privacy Preserving Dataset Operations, Mar. 2009, Macquarie University.

Bickson, D. et al. "Peer-to-Peer Secure Multi-party Numerical Computation," Peer-to-Peer Computing, 2008. P2P '08. Eighth International Conference on, vol., No., pp. 257-266, Sep. 8-11, 2008 doi: 10.1109/P2P.2008.22.

A. Senior and S. Pankanti, "Privacy Protection and Face Recognition," 236 Gray's Inn Road—Floor 6 London—WC1X 8HL—UK, 2011, pp. 671-692.

A. K. Jain, K. Nandakumar, and A. Nagar, "Biometric Template Security," EURASIP J. Adv. Signal Process, vol. 2008, pp. 113:1-113:17, Jan. 2008.

Y. Luo, Sen-Ching S. Cheung, and S. Ye, "Anonymous Biometric Access Control Based on Homomorphic Encryption," in IEEE International Conference on Multimedia and Expo, ICME 2009, 2009, pp. 1046-1049.

M. Osadchy, B. Pinkas, A. Jarrous, and B. Moskovich, "SCiFI—A System for Secure Face Identification," in IEEE Symposium on Security & Privacy, May 2010, pp. 239-254.

M. Barni et al., "A Privacy-Compliant Fingerprint Recognition System Based on Homomorphic Encryption and Fingercode Templates," in IEEE Intl. Conference on Biometrics: Theory Applications and Systems, 2010, pp. 1-7.

M. Upmanyu et al., "Blind Authentication: A Secure Crypto-Biometric Verification Protocol," IEEE Trans. on Information Forensics and Security, vol. 5, No. 2, pp. 255-268, Jun. 2010.

J.-S. Coron, A. Mandal, D. Naccache, and M. Tibouchi, "Fully Homomorphic Encryption over the Integers with Shorter Public Keys," in Advances in Cryptology—CRYPTO11, ser. Lecture Notes in Computer Science, vol. 6841, 2011, pp. 487-504.

* cited by examiner

SYSTEM FOR SECURE IMAGE RECOGNITION

CROSS-REFERENCE TO RELATED APPLICATIONS

This application claims the benefit of U.S. Provisional Application No. 61/596,151 filed on Feb. 7, 2012 by the present inventors, which is incorporated herein by reference. Furthermore, this application is a Continuation-in-Part of U.S. application Ser. No. 12/876,223 filed on Sep. 6, 2010 which claims the benefit of U.S. Provisional Application No. 61/240,177 filed on Sep. 4, 2009, which are incorporated herein by reference.

TECHNICAL FIELD

Disclosed embodiments relate to image processing. Specifically, they relate to methods, apparatuses, and systems for secured image processing, biometric recognition, and face recognition.

BACKGROUND

Face recognition is a prototypical image processing application where privacy constraints come into play, due to the sensitiveness of the involved biometric signals. In a common privacy-aware face recognition scenario, a user presents his/her face for matching against a database of enrolled clients, to verify a given identity; the database must not be disclosed to the new user, as this would harm the security of the system and the privacy of the enrolled users, while the face presented by the query user must not be disclosed to the recognition system, for preserving the user's privacy. There have been several recent proposals of efficient privacy-preserving solutions for this scenario, combining additive homomorphic encryption and garbled circuits, both focused on private face identification using a simple but effective recognition system, called Eigenfaces, based on applying a PCA projection matrix to the presented face, comparing the resulting coefficient vector to each of the templates in the database and picking the closest match.

However, this traditional scenario does not protect the privacy of the enrolled users, as the recognition system has clear-text access to the templates stored in the database and to the projection matrix. More involved scenarios, like outsourced ones, where Clouds or other untrusted environments are used not only for storing the databases but for performing certain operations, are becoming increasingly ubiquitous. If the matching database is stored in an untrusted third party together with the detection logic, enrolled users' privacy must also be protected, and that party must have access neither to the database contents nor to the fresh faces presented against the system for recognition. Additionally, it is desirable that the system can run autonomously without interaction rounds with the client, requiring the lowest computational effort from the client-side, that usually runs on an embedded or mobile device.

BRIEF DESCRIPTION OF THE DRAWINGS

Disclosed embodiments are illustrated by way of example, and not by way of limitation, in the figures of the accompanying drawings.

DETAILED DESCRIPTION

Disclosed embodiments are directed to methods, apparatuses, and systems for secured image processing, image recognition, and biometric recognition. Specifically, disclosed embodiments are directed to address the problem of biometric recognition and secure face verification for outsourced systems that work with a fully encrypted template database and query faces (total privacy) and provides a verification result without interaction with the client. According to one embodiment, the biometric recognition system implements quasi-fully homomorphic extension of Gentry's fully homomorphic cryptosystem. This enables to provide fully private noninteractive outsourced image processing in untrusted environments.

In this disclosure, matrices and (row) vectors are respectively represented as uppercase and lowercase boldface letters, while random variables are represented as uppercase letters; $[a]_d$ represents the reduction of a mod d; vector notation $a=[a_0, \ldots, a_{n-1}]$ and polynomial notation $a(x)=\Sigma_{i=0}^{n-1} a_i \cdot x^i$ will be used indistinctly when appropriate.

A. General Description of System for Secure Image Recognition.

According to one embodiment, the system for secure image recognition comprises a secure biometric recognition system configured to work directly with encrypted signals, and the secure biometric recognition system comprises an input quantization system and a homomorphic encryption system configured for noninteractive biometric recognition using a hardware processor. A distinguishing characteristic of the recognition system is that it enables both identification and verification working directly with encrypted values in a non interactive way.

According to a particular embodiment, and without limitation, the homomorphic encryption system is configured to operate both with binary and nonbinary plaintexts. In this embodiment, the system has the ability to work with nonbinary plaintexts and performing nonbinary arithmetic operations of them. Furthermore, in a more particular embodiment, the biometric recognition system includes a verification process (as opposed to an identification process) and can cope with situations where both the inputs and the templates are encrypted. In particular embodiments, the homomorphic encryption system is of the NTRU family and the quantization system performs nonlinear quantization (as opposed to linear quantization of the inputs). While the disclosed system can work in a plurality of biometric recognition applications, in a particular embodiment the homomorphic encryption system is configured to operate on biometric signals representing faces resulting in a secure face recognition system. According to a particular embodiment, as described below, the biometric signals comprise vectors of Gabor coefficients and the verification process includes a polynomial function.

Figure 1:
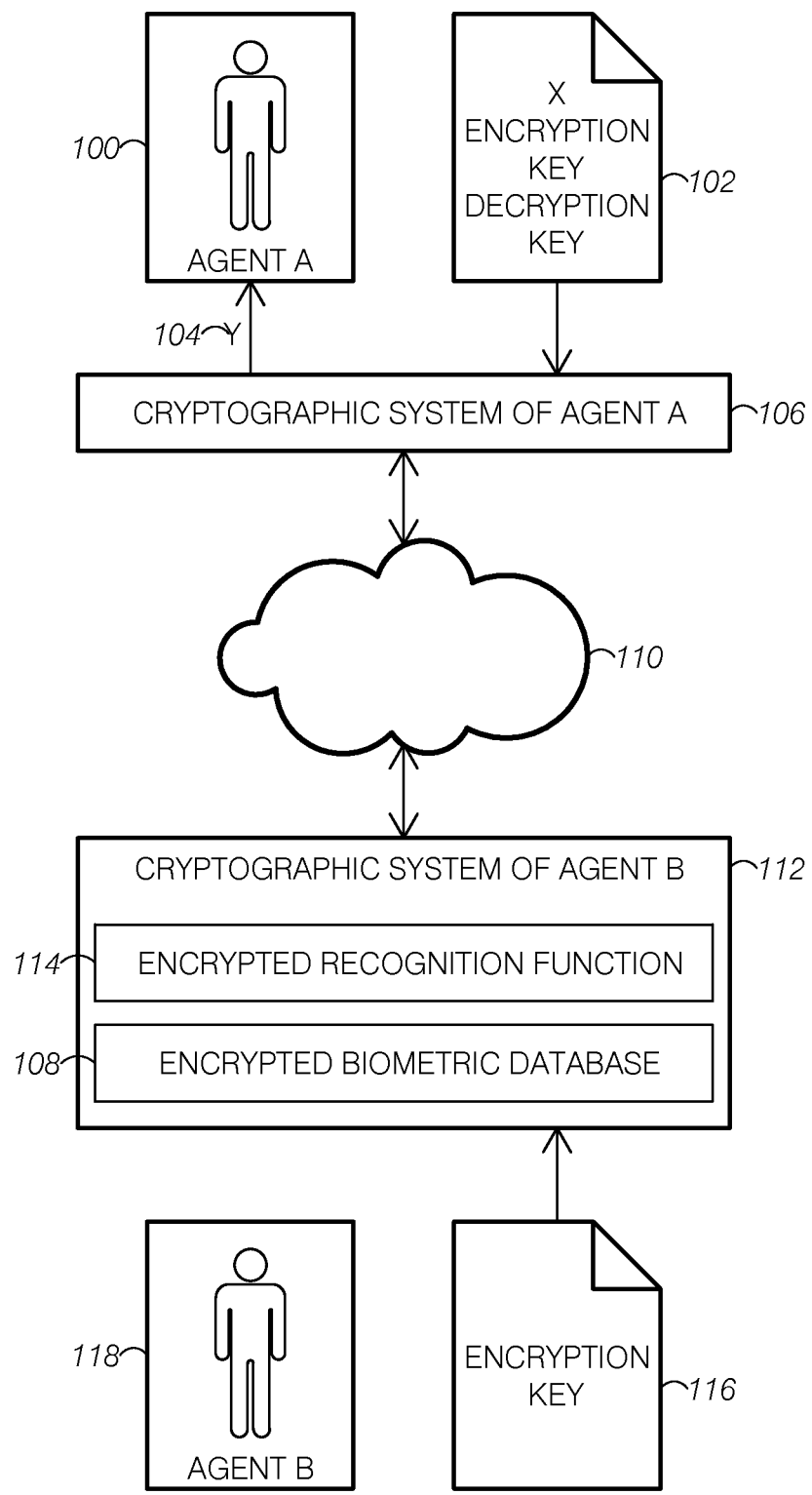
FIG. 1 shows a general descriptive illustration of the operation of the cryptographic system for biometric recognition according to one embodiment.

FIG. 1 shows a descriptive diagram of the operation of the cryptographic recognition system according to one embodiment. There are two parties $\mathcal{A}$ 100 and $\mathcal{B}$ 118. The first party owns a biometric vector x and both the encryption and dectyption keys for a homomorphic encryption system 102. The party $\mathcal{B}$ has only the encryption key 116 for the same homomorphic encryption. The cryptographic system is used at both ends 106 and 112 in order to privately solve the linear system of equations A·x=b. This cryptographic system is present in both ends: the system of party $\mathcal{A}$ 106 quantizes and encrypts the biometric vector [[x]] before sending it to $\mathcal{B}$ 112 through the communication channel 110 (e.g., a wired or wireless medium or a sole device). The system of party $\mathcal{B}$ 112 comprises a database of encrypted biometric templates 108 and it is able to execute the recognition function 114 on the encrypted database templates and the encrypted [[x]], to produce an encrypted recognition output [[y]], that is communicated back to $\mathcal{A}$ through the communication channel 110. The system of party $\mathcal{A}$ 106 is able to decrypt the recognition result y that is provided to $\mathcal{A}$ 100.

Figure 2:
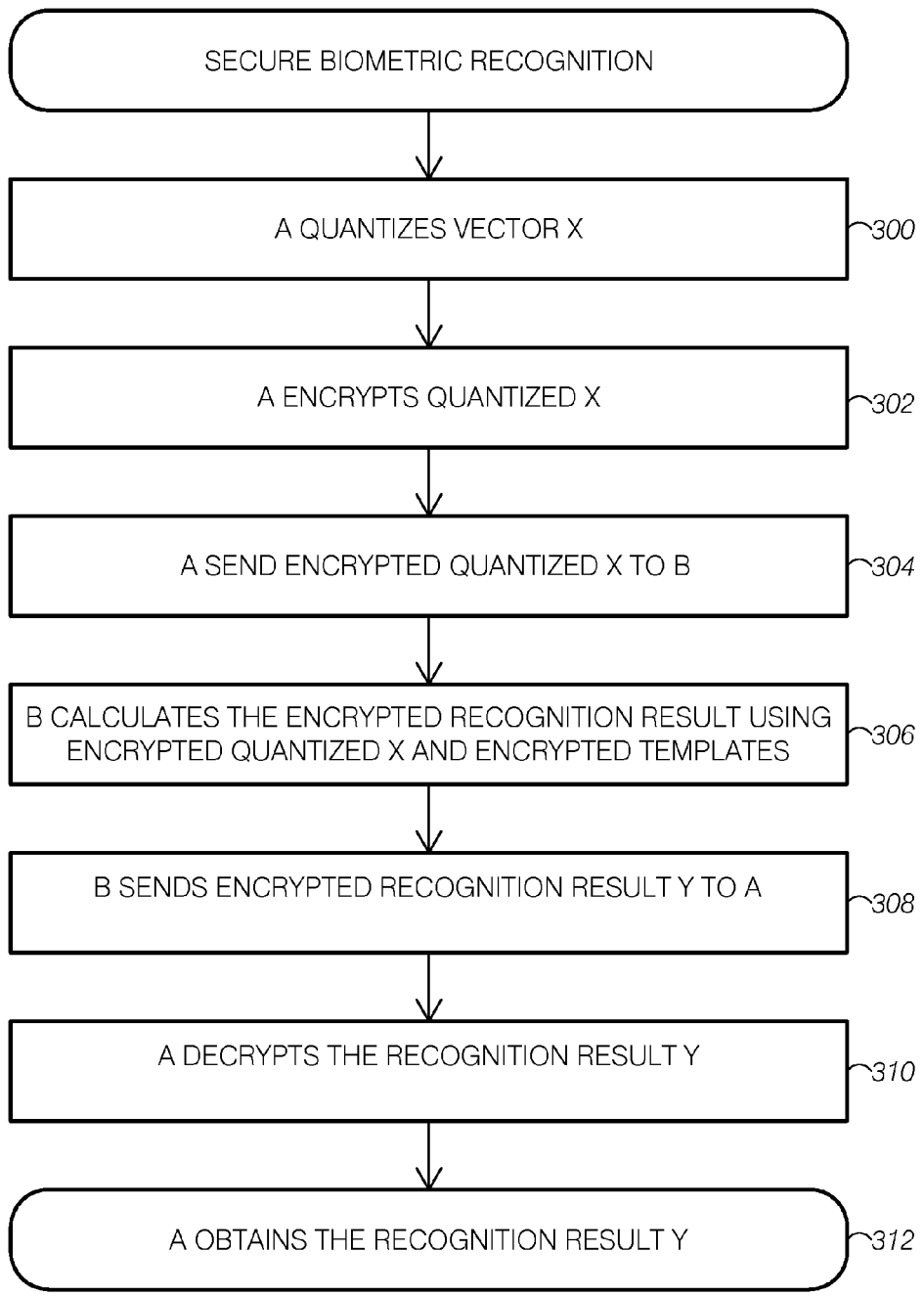
FIG. 2 shows a method implemented by the system to accomplish biometric recognition according to one embodiment.

FIG. 2 shows a block diagram of the method carried out by the secure biometric recognition system according to one embodiment, and without limitation. There are two parties $\mathcal{A}$ and $\mathcal{B}$. $\mathcal{A}$ owns a biometric feature vector x that is input to the system. This feature vector is quantified 300 and encrypted 302 by $\mathcal{A}$, using the encryption key of a homomorphic encryption system. $\mathcal{A}$ sends the resulting quantized and encrypted feature vector [[x]] to party $\mathcal{B}$ 304. $\mathcal{B}$ owns a database of encrypted biometric templates, but $\mathcal{B}$ cannot decrypt them, and cannot decrypt either the received [[x]]. Using the cryptographic system, $\mathcal{B}$ calculates 306 the encrypted biometric recognition result [[y]], using the encrypted database templates and the encrypted [[x]]. $\mathcal{B}$ sends the encrypted result [[y]] to $\mathcal{A}$ 308, who decrypts it 310 using the decryption key of the homomorphic encryption system. $\mathcal{A}$ obtains the decrypted recognition result y 312.

Certain specific details are set forth in the following description and figures to provide a thorough understanding of various embodiments disclosed. Certain well-known details often associated with computing and software technology are not set forth in the following disclosure to avoid unnecessarily obscuring the various disclosed embodiments. Further, those of ordinary skill in the relevant art will understand that they can practice other embodiments without one or more of the details described below. Aspects of the disclosed embodiments may be implemented in the general context of computer-executable instructions, such as program modules, being executed by a computer, computer server, or device containing a hardware processor or processing element. Generally, program modules include routines, programs, objects, components, data structures, etc. that perform particular tasks or implement particular abstract data types. Aspects of the disclosed embodiments may also be practiced in distributed computing environments where tasks are performed by remote processing devices that are linked through a communications network. In a distributed computing environment, program modules may be located in both local and remote storage media including memory storage devices. Those skilled in the art will appreciate that, given the description of the modules comprising the disclosed embodiments provided in this specification, it is a routine matter to provide working systems which will work on a variety of known and commonly available technologies capable of incorporating the features described herein. According to other embodiments the disclosed cryptosystem can be implemented in other hardware besides a digital computer including microcontrollers, DSPs, FPGAs or ASICs, as well as in firmware.

B. Description of a Particular Embodiement.

According to a particular embodiment, and without limitation, the system is based on Gentry's bootstrappable fully homomorphic cryptosystem. The cryptosystem is GGH-type based on ideal lattices. The rationale behind GGH cryptosystems lies in choosing two bases for a given lattice L, $B_{sk}$ and $B_{pk}$, respectively the secret key (a good basis with quasi-orthogonal vectors) and the public key (a bad basis, normally chosen as the Hermite Normal Form, HNF, of the lattice) of the cryptosystem. The encryption c of a message m, consists on the addition of an error vector e s.t. $\|e\|_1 < \lambda_1(L)$, that encodes m, to a point in the lattice. For decrypting, the error vector e is recovered using the basis $B_{sk}$ as e'=c mod $B_{sk}$.

The somewhat homomorphic scheme presented by Gentry, following the same approach as Smart and Vercauteren, uses a principal-ideal lattice J, generated by a chosen polynomial v(x) with t-bit signed random integer coefficients (v in its vector notation), in the ring of polynomials modulo $f_n(x) \triangleq x^n+1$, with a specific structure for its HNF $$B = HNF(J) = \begin{pmatrix} d & 0 \\ r & I_{n-1} \end{pmatrix},$$

where d can be defined as d=det(J) or, equivalently, as the resultant of the polynomials v(x) and $f_n(x)$, and r is a root of $f_n(x)$ mod d, that forms the vector $r=[-r,-[r^2]_d, \ldots, -[r^{n-1}]_d]^t$. B is the public key encryption matrix, completely determined by the integers d, r, while the private key is given by v(x) and its scaled (mod $f_n(x)$)–inverse w(x) (v(x)×w(x)=d mod $f_n(s)$).

As defined, this cryptosystem is quasi-homomorphic under addition and multiplication, that are directly mapped from the crypto-text ring (errors w.r.t. lattice points) to the clear-text ring. There is, however, a restriction to this homomorphism, as both operations are only correctly mapped when the error lies within the same Voronoi region of the lattice L after applying the operation. Consequently, according to one embodiment, the cryptosytem for biometric recognition extends Gentry's crypto system as follows.

B.1. Extension of Gentry's Cryptosystem.

One of the limitations of Gentry's cryptosystem is that it can cope only with binary numbers, being the homomorphic ring operations and and xor gates; this means that simple arithmetic circuit with b-bit numbers needs a high amount of binary homomorphic operations that increase the noise within the Voronoi region of the lattice, whose volume determines the maximum number of operations that do not lead to a decoding error. The maximum depth of an executable polynomial has been calculated empirically by Gentry and Haley and used for bootstrapping the decryption circuit and achieving a full homomorphism.

This disclosure shows how to extend the plaintext-size, allowing for homomorphic additions and multiplications in $\mathbb{Z}_{2^k}$ (powers of two are chosen for convenience); we also give a theoretical bound on the maximum number of executable multiplications, that also supports Gentry's empirical study for $\mathbb{Z}_2$. The extension seeks to enhance the efficiency of arithmetic non-interactive operations and decrease the cipher expansion rate and to trade the full homomorphic property by the possibility of dealing with a limited but high number of sequential arithmetic processing without interaction. These extensions are used in embodiments of the biometric recognition cryptosystem claimed and disclosed, and are explained below.

Encryption: In Gentry's original cryptosystem, the encryption operation of a bit b $\in \mathbb{Z}_2$ uses a random noise vector u $\in \{0,$ $\pm 1\}^n$, with each entry chosen as 0 with probability q and $\pm 1$ with probability $(1-q)/2$ each; we extend the encryption for coping with $m \in \mathbb{Z}_{2^k}$:

$$a = 2^k u + m \cdot e_1; \ c = a \bmod B = [a(r)]_d \cdot e_1.$$

The vector c, as in the original construction, has only one non-zero component, representative of the encryption: $c = [a(r)]_d = [m + 2^k \sum_{i=0}^{n-1} u_i r^i]_d$.

The complexity of encrypting a k-bit number is the same as for encrypting a bit in the original system. Furthermore, the security in terms of Birthday-type attacks is not altered either, as the noise vector has the same bits of entropy; hence, given a security level $\lambda$, q may still be chosen as $$2^{(1-q)n} \cdot \binom{n}{qn} > 2^{2\lambda}.$$

Decryption: For the decryption, the original scheme uses an optimized procedure that only needs one of the odd coefficients of w mod d, denoted $w_i$. Hence, the decryption for a k-bit message m becomes $m = [c \cdot w_i]_d w_i^{-1} \bmod 2^k$. The only difference w.r.t. the original decryption is the product by $w_i^{-1} \bmod 2^k$; being $w_i$ odd, it always exists: the choice of powers of two for the extended plaintext allows for keeping the same key generation process, while the added decryption complexity is negligible compared to mod d operations.

Homomorphically Achievable Polynomial Degree: Incorrect decryption may only happen when the error vector added to a lattice point lies outside the Voronoi region of the used lattice. This condition boils down to $\|a \cdot W\|_\infty < d/2$, where W is the rotation basis that generates (w(x)), having in each row the coefficients of $w(x) \cdot x^i \bmod f_n(x)$. We can bound $$\|aW\|_\infty \le \|a\|_\infty \|W\|_\infty = \max_i(|a_i|) \cdot \sum_{i=0}^{n-1} |w_i| \le \sum_{i=0}^{n-1} |w_i| \sum_{i=0}^{n-1} |a_i|,$$

$$\sum_{i=0}^{n-1} |w_i| \sum_{i=0}^{n-1} |a_i| < d/2 \Rightarrow \|aW\|_\infty < d/2.$$

The number of non-zero elements ($Nz_j$) of a chosen $u_j$ follows a Binomial distribution $Nz_j \sim Bi(n, 1-q)$. In a fresh encryption, each of these elements has modulus $2^k$, while the message has a modulus $|m| < 2^k$. Hence, $\sum_{i=0}^{n-1}(|a_i|) < 2^k(1 + Nz_j)$.

On the other hand, after a multiplication between two ciphertexts $c_1$ and $c_2$ (in the polynomial quotient ring $\mathbb{Z}_d[x]/(f_n(x))$), the resulting point must also be within the Voronoi region. The product of two polynomials modulo $f_n(x)$ is equivalent to a cyclic convolution of their coefficient vectors (with a sign change for the overlapped subvector). Furthermore, as fresh encryptions have the same absolute value ($2^k$) for all the non-zero coefficients of u, the $L_1$ norm of the resulting coefficient vector of the product of a given ciphertext $c_1$ and a fresh encyrption $c_2$ is upper-bounded by $\|c_1\|_1 \cdot 2^k(1 + Nz_2)$. In general, we have that, after $n_m$ successive products of a cipher by fresh encryptions, we can bound the probability of decryption error $$P[dec \ error] =$$

$$P[\|aW\|_\infty \ge d/2] \le P\left[\underbrace{\sum_{i=0}^{n_m} \log(1 + Nz_i)}_{N_{n_m}} \ge \log\left(\frac{d}{2^k(n_m + 1) + 1 \sum_{i=0}^{n-1} |w_i|}\right)\right],$$

where $N_{n_m}$ can be accurately approximated, using the CLT, by a Gaussian variable with mean $$(n_m + 1) \cdot \mu = (n_m + 1) \cdot \cdot \sum_{i=0}^{n} \log_2(1 + i)\binom{n}{i}(1-q)^i q^{n-i}$$

and variance $$(n_m + 1) \cdot \sigma^2 = (n_m + 1) \cdot \sum_{i=0}^{n} (\log_2(1 + i) - \mu)^2 \binom{n}{i}(1-q)^i q^{n-i}.$$

It is possible to bound the maximum number of bits to which we can extend the ciphertext for allowing a given number $n_m$ of successive multiplications with a given probability of error $p_e$:

$$k_{max} = \left\lfloor \frac{\log_2(d/\|w\|_1) - 1}{n_m + 1} - \mu - \frac{Q^{-1}(p_e)\sigma}{\sqrt{n_m + 1}} \right\rfloor. \quad (1)$$

Accordingly, the maximum number of bits decreases with $1/n_m+1$), and it is heavily influenced by the quotient $d/\|w\|_1$, that intuitively indicates the effective radius of the Voronoi region, supporting noise addition. On the other hand, the choice of t (bit-size of each $v_i$) determines the minimum value of this quotient: as the polynomial product of $v(x) \times w(x) = d \bmod f_n(x)$, in vector notation this means that, using the Hölder inequality:

$$d = v \cdot [w_0, -w_{n-1}, \ldots, -w_1]^t \le \|v\|_\infty \|w\|_1 < 2^t \|w\|_1 \Rightarrow \frac{d}{\|w\|_1} < 2^t.$$

Hence, for a good lattice, the maximum decodable noise norm (decryption radius) will be close to t bits, and we can provide an estimation of the maximum plaintext bit-size for correct decryption after a given number of multiplications for a generic good lattice, just substituting $\log_2(d/\|w\|_1)$ by t in Eq. (1). Reciprocally, the inverse of this expression yields the maximum number of affordable multiplications without decryption error. It must be noted that $n_s$ consecutive homomorphic additions can increase at most in $\log_2(n_s)$bits the size of the $\infty$-norm of the noise vector (Eq. (1) can take this into account by subtracting $\log_2(n_s)$ from t). Hence, when determining the maximum degree of a polynomial run on fresh ciphered variables, the maximum number of multiplications is the determining factor. Gentry and Halevi provide an approximation of the maximum degree deg of an elementary

TABLE 1

Lower bound on the maximum number of products and Gentry's empirically obtained maximum degree polynomial as a function of t, with n = 128

| t | 64 | 128 | 256 | 384 |
|---|----|-----|-----|-----|
| Lower bound | 10 | 22 | 46 | 69 |
| Empirical (Gentry) | 13 | 33 | 76 | 128 | symmetric polynomial evaluated on m encrypted binary variables, bounding the decryption radius by the approximated Euclidean norm of the polynomial output: $2^t \geq c^{deg}\sqrt{\binom{m}{deg}}$; the results deviate from this expression for large m due to the overestimation of the effect of additions, as the combinatorial number of summed monomials grows above the dimensionality of the lattice, and cannot be considered independent anymore. Table 1 shows the validity of our bound compared to the experimental results obtained by Gentry.

Figure 3:
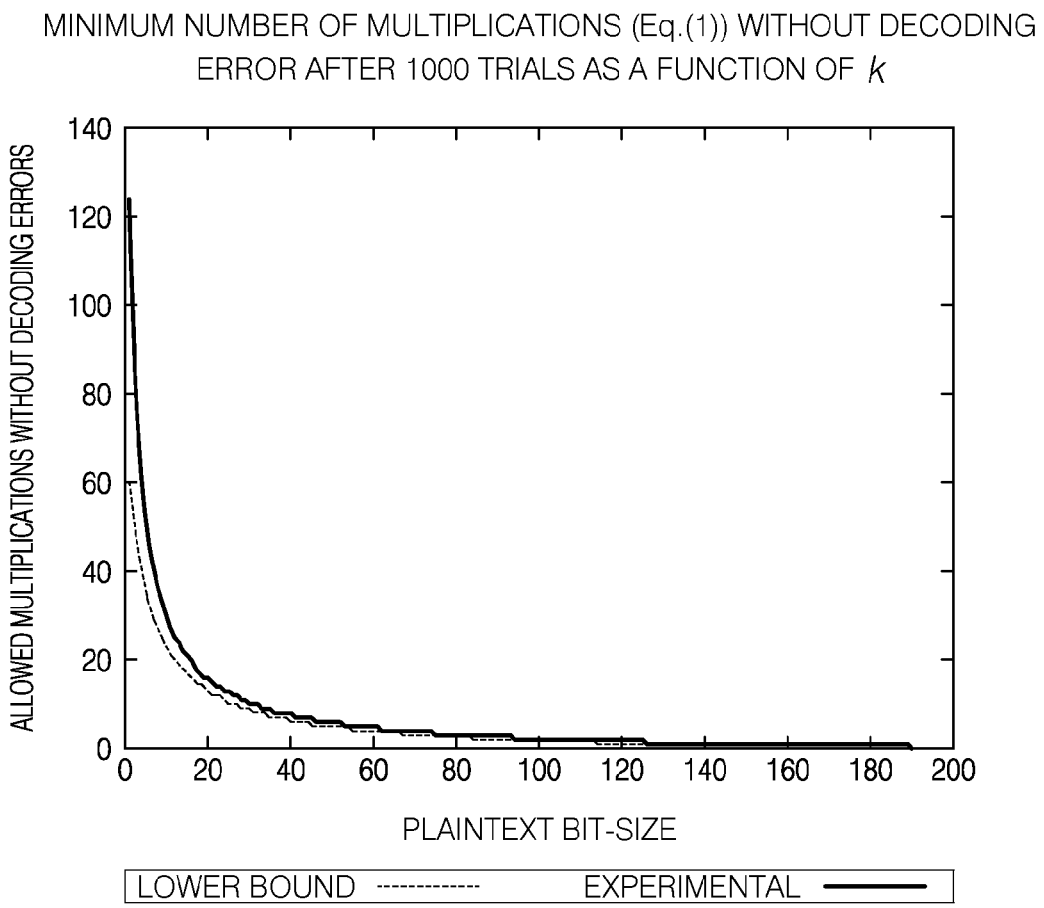
FIG. 3 shows illustrative simulation results according to one embodiment.

FIG. 3 represents the number of sequentially performed products with new fresh ciphers before a decryption error occurs (for n=512, t=380 and q=1-20/512, picking the minimum of 1000 trials), compared to the given lower bound for $p_e=10^{-4}$. The bound is fairly conservative for small plaintexts that allow for a high amount of products, as it is a worst-case bound, but it becomes tight for medium-to-high k, even when the Gaussian approximation in those cases provides an overestimation of the decryption error. We have also obtained very similar results with bigger lattices (as Gentry and Halevi did for the binary case), due to the quotient $\log_2(d/\|w\|_1)$ being virtually constant for all the found lattices, and the binomial distribution barely changing with high n when fixing the rate (1−q)·n.

B.2 Fully Private NonInteractive Face Verification.

In order to test the benefits and versatility of embodiments of the proposed extended cryptosystem in a typical scenario, we have tested it for outsourced face verification with privacy constraints. In this scenario, a query user presents his face features and a tentative ID against a database; the system must determine if those features actually correspond to the previously enrolled ID. The target of the outsourced privacy-preserving system is to conceal both the presented face features and the database templates to the party that runs the verification process, while the database templates are also not disclosed to the query user.

According to one embodiment, the system uses a face representation that employs quantized Gabor features using a Lloyd-Max quantization based on an accurate model of Gabor coefficients' moduli. Other privacy-preserving systems presented in the literature are based on Eigenfaces. In the clear, Gabor filters provide a slightly more complex solution with a better performance (about 8% increase) in known databases like LFW due to the biological models that support the use of Gabor filters. In this embodiment, the system works with indices of quantized coefficients instead of the actual quantized values; this allows for a hugely reduced plaintext size without much degradation in system performance (as shown below), and benefits from an inherent normalization of the Jets provided by the quantization process itself. In a particular embodiment tested to show illustrative performance results, the verification algorithm is based on either average correlation (cosine distance) or average Euclidean distance.

In the enrollment phase, the presented feature vectors are encrypted and stored in a central database for later use as templates. The verification threshold η is a system parameter also kept encrypted. In the verification phase, a user presents an ID to be matched together with the encrypted quantized Gabor coefficients g from his face. The database holder homomorphically calculates the encryption of the soft score $\Sigma_{i=0}^{N_{templates}}\text{dist}(\text{template}_i, g) - N_{templates}\eta$, that is provided as the output of the verification process. If a binary hard score is needed, then known comparison protocols could be used afterwards, involving interaction with the client, but we are aiming at a fully noninteractive solution, testing the raw performance of the extended cryptosystem in this scenario.

TABLE 2

Average correct recognition rate for LFW's view 2 for Gabor coefficients quantized with N levels and for Eigenfaces

| Gabor unquant. | N = 8 | N = 4 | N = 2 | Eigenfaces |
|---|---|---|---|---|
| 65.95% | 62.90% | 62.60% | 60.65% | 60.02% |

Figure 4:
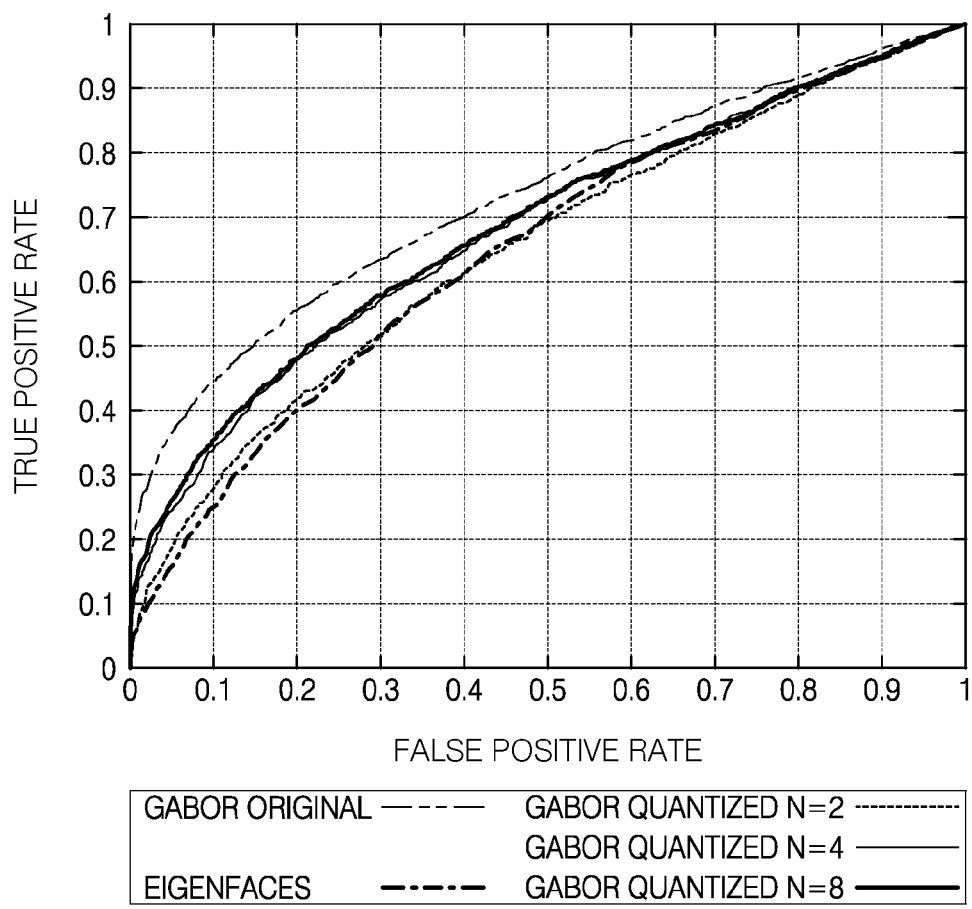
FIG. 4 shows illustrative performance results regarding the recognition accuracy according to one embodiment of the system.

We have tested the application of an embodiment of the encrypted verification system using Euclidean distance as comparing metric in several commonly used databases; due to space constraints, we show only the results on the challenging LFW (Labelled Faces in the Wild). Regarding the recognition accuracy, FIG. 4 and Table 2 respectively show the ROC curves and correct recognition rate for the biometric system using 2,4 or 8-level Lloyd-Max quantization of Gabor coefficients' moduli, compared to the original unquantized clear-text system and a detector based on Eigenfaces. Correct recognition rate for the quantized Gabor system (8-levels) is around 63%, approximately the same performance as baseline V1-like recognition systems, resulting the degradation with respect to the original unquantized system (around 3%) from using just quantization indices instead of the truly quantized values; nevertheless, original performance can be recovered even for 4 quantization levels by applying precalculated weights to the Gabor coefficients; on the other hand, Eigenfaces' performance goes down to near 60%, on the order of baseline pixel-space recognition systems.

According to a particular embodiment, and without limitation, an 8-level quantization is used since it provides an adequate compromise between clear-text cardinality and recognition performance. In a particular embodiment, the system fixes the size of the used lattice to n=512 dimensions, with t=380 and q=1-20/n, for a security parameter of λ≈70. More particularly, and without limitation, the system works with 5200-dimensional Gabor vectors for each face (13×10 localizations, 8 orientations and 5 scales) with 3-bit coefficients, so calculating the Euclidean distance between two vectors needs one multiplication per pair of values, 5199 additions and one subtraction. Hence, starting from 8-level coefficients, the resulting score is correctly represented using $\lceil\log_2(5200\cdot 8^2)\rceil=19$ bits, so we use k=19 bits for the extended cryptosystem. Taking into account the $\log_2(5200)=12.3$ bits of decrease for the effective decryption radius, Eq (1) yields 13 supported consecutive multiplications, so the extended cryptosystem can perfectly cope with the whole distance calculations, without incurring in decryption errors (but with negligible probability).

For implementation of the particular embodiment tested to generate example illustrative results, we have used the GMP and NTL libraries for C++, and tested the time efficiency without any kind of parallelization in one core of an Intel i5 at 3.30 GHz with 8 GB of RAM. Table 3 shows the efficiency figures for the proposed algorithm compared to the expected running times of a traditional implementation based on an additive homomorphism (Paillier-based, using a 2048-bit modulus), with either clear-text templates (PaillierCT, partial privacy) and with encrypted templates (PaillierE, total privacy using interactive multiplication protocols); in both Paillier-based systems the client provides the encryptions of both his face coefficients and their squared value, in the most favorable case for Paillier's homomorphism; we have also included, for reference, the estimated execution time of Gentry's original binary cryptosystem using binary circuits for addition and multiplication; this system cannot provide valid outputs without using homomorphic deciphering circuits, as the degree of the distance circuit exceeds the noise capacity of the used lattice; each of these circuits (for bootstrapping the cipher of a bit), that needs to be applied after each binary multiplication gate, runs in about 8 seconds in our test machine; this would astronomically increase the server's computational load in the binary version of Gentry (the whole circuit involves around $3.2 \cdot 10^5$ products); we do not include them into the time evaluation, but they are an inherent limitation of the original binary cryptosystem.

Thanks to the extension disclosed in this work, the proposed system becomes feasible both in terms of bandwidth and server processing time overcoming the pointed out limitation; the use of homomorphic operations in $\mathbb{Z}_{2^k}$ instead of $\mathbb{Z}_2$ reduces the server computation time

TABLE 3

Efficiency figures for the privacy-preserving face-verification algorithm: client times, server homomorphic processing (HP) time and needed bandwidth in almost two orders of magnitude (furthermore, binary encryptions do not provide a correct output without the needed deciphering circuits), while the bandwidth is divided by a factor of three.

| Execution times | Client | | Server | |
| --- | --- | --- | --- | --- |
| | Cipher | Decrypt | (HP) | Bandwidth |
| Proposed | 0.4 s | 0.0026 s | 12.3 s | 127 MB |
| Gentry (binary) | 1.3 s | 0.052 s | 883.4 s | 380 MB |
| PaillierCT | 15.4 s | 0.0043 s | 57.99 s | 5.3 MB |
| PaillierE | 22 s | 43.2 s | 479.0 s | 13.3 MB |

In terms of computational efficiency, the embodiments of the extended cryptosystem disclosed yields a clear advantage w.r.t. any of the others, even for Paillier with clear-text templates. The load for the client is decreased in two orders of magnitude w.r.t. Paillier, while the server's load decreases in a factor of almost 50. This is due to the lighter homomorphic operations for Gentry's even when they work with larger ciphertexts. Conversely, the transferred encryptions for the proposed system are less than one order of magnitude higher than for encrypted Paillier templates, due to the larger expansion factor that lattice cryptosystems like Gentry's present; this is the main fact that holds back the performance of the homomorphism; the presented extension advances in this path, reducing the expansion factor and greatly increasing the efficiency of the operations performed noninteractively at the server. Furthermore, when the scenario of interest is an outsourced system that processes private data, the initial bandwidth is not critical: the more operations can be performed unattendedly, the more versatile and powerful the system becomes.

While particular embodiments have been described, it is understood that, after learning the teachings contained in this disclosure, modifications and generalizations will be apparent to those skilled in the art without departing from the spirit of the disclosed embodiments. It is noted that the disclosed embodiments and examples have been provided merely for the purpose of explanation and are in no way to be construed as limiting. While the methods, systems, and apparatuses have been described with reference to various embodiments, it is understood that the words which have been used herein are words of description and illustration, rather than words of limitation. Further, although the system has been described herein with reference to particular means, materials and embodiments, the actual embodiments are not intended to be limited to the particulars disclosed herein; rather, the system extends to all functionally equivalent structures, methods and uses, such as are within the scope of the appended claims. Those skilled in the art, having the benefit of the teachings of this specification, may effect numerous modifications thereto and changes may be made without departing from the scope and spirit of the disclosed embodiments in their aspects.

The invention claimed is:

1. A system for secure image recognition comprising a secure biometric recognition system configured to work directly with encrypted templates and encrypted query features, said secure biometric recognition system comprising an input order-preserving quantization system and a homomorphic encryption system configured for noninteractive biometric recognition in a single communication round using a hardware processor,
wherein:
a first party utilizes the input order-preserving quantization system to quantify a query feature vector and utilizes the homomorphic encryption system to encrypt the quantized query feature vector,
the first party sends the quantized and encrypted query feature vector to a second party that owns a database of encrypted templates but cannot decrypt them and cannot decrypt the received quantized and encrypted query feature vector,
the second party utilizes the homomorphic encryption system to calculate an encrypted biometric recognition result using the encrypted templates and the quantized and encrypted query feature vector,
the second party sends the encrypted biometric recognition result to the first party who decrypts it to obtain a decrypted biometric recognition result.

2. The system of claim 1, wherein said homomorphic encryption system is configured to operate both with binary and non-binary plaintexts.

3. The system of claim 2, wherein said biometric recognition includes a verification process.

4. The system of claim 3, wherein said input quantization system is configured for nonlinear quantization.

5. The system of claim 4, wherein said homomorphic encryption system is configured to operate on biometric signals representing faces implementing a secure face recognition system.

6. The system of claim 5, wherein said biometric signals comprise vectors of Gabor coefficients.

7. The system of claim 6, wherein said verification process includes a polynomial function.

* * * * *